United States Patent Office 3,278,483
Patented Oct. 11, 1966

3,278,483
POLYOLEFINS CONTAINING A TRITHIOPHOS-
PHITE AND EITHER A SALICYLATE OR A BEN-
ZOPHENONE AS STABILIZER
Bernard Wright, Eccles, near Manchester, and George R.
Williamson, Davyhulme, near Manchester, England, as-
signors to Shell Oil Company, New York, N.Y., a cor-
poration of Delaware
No Drawing. Filed May 27, 1963, Ser. No. 283,553
Claims priority, application Great Britain, June 1, 1962,
21,229/62
8 Claims. (Cl. 260—45.85)

This invention relates to stabilized hydrocarbon poly-
mers. More particularly, it relates to the stabilization
of low pressure polymers of alpha-monoolefins, such as
Ziegler type polyethylene, against deterioration resulting
from exposure to heat and light. Stabilization is ac-
complished with a novel combination of stabilizers.

Polyolefins such as polyethylene, in common with most
synthetic polymers, may undergo degradation and dis-
coloration in use. This may occur as a result of exposure
to light, or as a result of processing, e.g., milling or other
working at elevated temperatures, i.e., above 100° C. A
number of compounds have been proposed as additives
for inhibiting oxidation or photo-degradation of hydro-
carbon polymers which have been heretofore commercial-
ly used. Many of these additives are not desirable for
use with low pressure poly-alpha olefins, for various rea-
sons; for example, they may result in undesirable side
effects, such as substantial decoloration of the polymer,
even while they serve to inhibit oxidation, or they may
cause unpleasant odors.

Much effort has been devoted to the problem of find-
ing satisfactory stabilizers to protect polyolefins from the
effects of heat and light.

Many kinds of additives have been proposed hitherto
for use in hydrocarbon polymers but there is still a need
in the art for an effective stabilizer system for hydrocar-
bon polymers, that is to say, one or more additives which
alone or in combination can be added to hydrocarbon
polymers, particularly Ziegler polyethylene, to confer
both light and heat stability under certain of the more
severe conditions of processing and subsequent consumer
usage to which such hydrocarbon polymers may be sub-
jected.

Surprisingly, it has now been found that good thermal
and light stabilization can be obtained by the use in hy-
drocarbon polymers of (a) certain organic compounds
containing both sulfur and phosphorus in their molecular
structures in combination with (b) certain derivatives of
benzophenone or salicylic acid, and that this combina-
tion is substantially free of objectionable odor during
processing. It has been found, for example, that organic
thiophosphites are better thermal stabilizers than the cor-
responding organic phosphites and that surprisingly the
organic thiophosphites appear to give rise to less odor
during thermal processing, e.g., molding, of polymers
containing them than do the corresponding organic phos-
phites. Also, the improvement in the stabilizing effect
of an organic trithiophosphite when it is present to-
gether with one of said benzophenone or salicylic acid
derivatives in the polymer composition, as compared with
the stabilizing effect of either compound above, indicates
that synergism arises when the compounds are used in
combination. The present invention is not, however,
limited to the use of organic trithiophosphites but also in-
cludes the use, in similar combinations, of organic mono-
and di-thiophosphites or of organic thiophosphates, in-
cluding those containing either sulfur or both sulfur and
oxygen in the molecule.

Accordingly, the present invention provides a polymer
composition which comprises a major weight proportion
of a hydrocarbon polymer such, for example, as a poly-
olefin and a minor weight proportion of additives com-
prising (a) an organic compound of the formula:

(1)
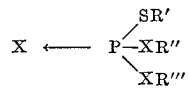

or (2)

in which R', R" and R''' represents the same or dif-
ferent hydrocarbon radicals, which radicals can be sub-
stituted or not, S represents a sulfur atom, and X repre-
sents either a sulfur atom or an oxygen atom; and (b) a
derivative of benzophenone or salicylic acid represented
by the general formula

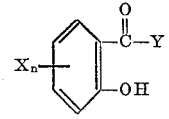

in which X represents a hydrogen atom, a halogen atom
or a radical selected from substituted and unsubstituted
alkyl, cycloalkyl, aryl, alkoxy, aryloxy, acyl or aroyl
radicals; $n$ is 0, 1, 2, 3 or 4; and Y represents a substi-
tuted or unsubstituted hydrocarbon radical, preferably
an aryl radical, or a substituted or unsubstituted radical
—OR' in which R' represents a substituted or unsubsti-
tuted alkyl or aryl radical; when $n$ is greater than 1, 2
can represent identical or different members of its group.
Combinations of certain preferred compounds of the two
types provide particularly outstanding and unusually use-
ful protection of low pressure polyethylene against
thermal degradation and deterioration due to ultraviolet
radiation.

The organic phosphorus- and sulfur-containing organic
compounds which can be used in carrying out the present
invention include those in which the hydrocarbon radi-
cals R', R" and R''', are aliphatic, aryl-substituted ali-
phatic, cycloaliphatic, aromatic or alkyl-substituted aro-
matic radicals; such radicals can, if desired, contain sub-
stituent atoms or groups, e.g., halogen atoms and hydroxyl
alkoxy, aryloxy, acyl, aroyl, carboxyl and ester groups,
which do not adversely affect the hydrocarbon polymer
or interfere with or materially reduce the stabilizing
properties of the thiophosphite. Usually each radical R',
R" and R''' will be the same and preferably an alkyl
radical or an alkyl-substituted (preferably mono-alkyl-
substituted) phenyl radical, the alkyl radical or the alkyl
substituent of the phenyl radical preferably containing at least six carbon atoms, in particular from six to twenty and advantageously eight to fifteen carbon atoms. Preferably a trithiophosphite is used, as for example, trilauryl trithiophosphite, trinonylphenyl trithiophosphite or tridodecyl trithiophosphite. Other suitable trithiophosphites are trioctyl trithiophosphites; trihexylphenyl trithiophosphite; tridecyl trithiophosphite; tribenzyl trithiophosphite; tristearyl trithiophosphite; tridecylphenyl trithiophosphite; tribenzoylphenyl trithiophosphite; tricyclohexyl trithiophosphite; tripalmityl trithiophosphite; tri(hydroxyphenyl) trithiophosphite; tri(methoxyphenyl) trithiophosphite; trichlorolauryl trithiophosphite; tri(dihydroxyphenyl) trithiophosphite; tri(diethoxyphenyl) trithiophosphite; trinaphthyl trithiophosphite and tri(carboxyphenyl) trithiophosphite.

As previously indicated the present invention is not limited to the use of organic trithiophosphites, although the trithiophosphites are at present preferred, and it is also possible to use, in addition to thiophosphites containing three sulfur atoms in the molecule, such phosphorus- and sulfur-containing organic compounds as the compounds:

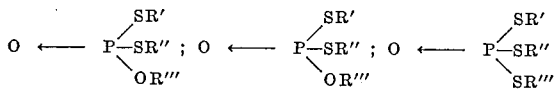

and the corresponding compounds containing the

structure.

The second essential ingredient of the synergistic stabilizer combinations of this invention is characterized by the presence of the

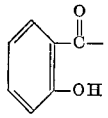

group. This group is present both in substituted benzophenones and in esters of salicylic acid. Various compounds of both of these types are effective light stabilizers for polyolefins. Compounds containing the above group will be sometimes referred to herein as "aromatic stabilizers."

The generic formula for the aromatic stabilizers, given

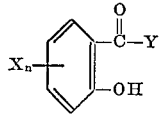

above, is where the symbols $n$, X and Y have the previously stated meanings.

In the case of U.V. stabilizers of the salicylate type these are preferably compounds of the formula:

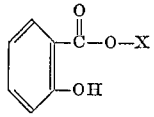

in which Y represents an alkyl-substituted phenyl radical in which the alkyl substituent thereof contains up to 20 carbon atoms as, for example, tertiary butyl, isopropyl and the $C_8$ to $C_{14}$ straight chain radicals. If desired the alkyl substituent can itself carry a non-aliphatic or non-hydrocarbon substituent or both as, for example, in the case of an alkyl-substituted phenyl salicylate in which the alkyl radical carries one or more aromatic radicals, halogen atoms or sulfur-containing radicals. Preferred U.V. stabilizers of the salicylate type are the alkyl-substituted phenyl salicylates in which the alkyl substituent contains at least 4 carbon atoms, e.g., 4-tertiary-butyl-phenyl salicylate, octyl-phenyl salicylate, and dodecyl-phenyl salicylate and also phenyl salicylates containing one or two alkyl substituents in the main (i.e., hydroxyl-containing) aromatic ring, e.g., phenyl salicylate or an alkyl-phenyl salicylate containing two isopropyl radicals in the main aromatic ring.

In the case of the ketone type of U.V. stabilizer these are preferably benzophenone derivatives containing an alkoxy or aryloxy radical and an hydroxy group as substituents in one aromatic ring and, optionally, an hydroxyl group as a substituent in the other aromatic nucleus. In general such benzophenone derivatives can be represented by the general formula

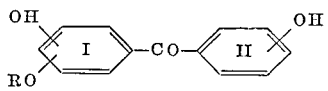

in which —OR represents an alkoxy or aryloxy radical, which itself can be substituted or unsubstituted, and the —OH group shown in ring II is an optional substituent therein. Preferably —OR represents an alkoxy radical containing 1 to 15 (preferably 1 to 10) carbon atoms, which radical is preferably in the 4-position. Preferably the OH group or the OH groups (when ring II also carries an OH group) are in the 2-position and 2,2'-positions respectively. The preferred benzophenone derivatives of the 4-alkoxy-2,2'-dihydroxy benzophenone type are those in which the alkoxy groups contain 1 to 10 carbon atoms, in particular 2,2'-dihydroxy-4-n-octyloxy benzophenone and 2,2'-dihydroxy-4-methoxy benzophenone. Other available benzophenone type U.V. stabilizers include 2,2',4-trihydroxy-4-methoxy benzophenone; 2-hydroxy, 4,4'-dimethoxy benzophenone; 2-hydroxy-4-methoxy benzophenone; 2-hydroxy-4-methoxy-4'-chlorobenzophenone; 2-hydroxy-4-methoxy-2,4'-dichlorobenzophenone; 2-hydroxy-4-methoxy-2'-carboxy benzophenone and 2-hydroxy-4-n-octyloxy-5-sulfobenzophenone. It will be understood, therefore, that the benzophenone molecule can also contain other substituents in addition to hydroxy groups and alkoxy (or aryloxy) radicals. The preferred benzophenone derivatives for use in carrying out the present invention are the 2-hydroxy-4-alkoxy-benzophenones having alkoxy substituents containing 1 to 15 carbon atoms, e.g., 2-hydroxy-4-dodecyloxy-benzophenone and the corresponding 2,2'-dihydroxy benzophenones.

Especially preferred combinations according to this invention comprise trilauryl thiophosphite as the sulfur- and phosphorus-containing compound and octyl phenyl salicylate or 2-hydroxy-4-n-octyloxy benzophenone as the second component.

It is to be understood that the present invention does not exclude the use in olefinic polymers of organic phosphorus- and sulfur-containing compounds and/or compounds having U.V. stabilizing properties which contain in their molecular structures atoms, groups or radicals not specifically mentioned in connection with the general formulae referred to above and which do not interfere with or reduce the efficacy of these additives and do not adversely affect the polymeric material with which they are blended. Thus, for example, it is possible within the scope of the present invention for one or more of the hydrocarbon radicals of the phosphorus- and sulfur-containing additives and the main aromatic ring of the U.V. stabilizer (that is referring to the general formula defined above) to contain one or more hydrocarbon radicals, alkoxy and aryloxy radicals, halogen atoms, sulfonic acid groups, ester groups and aldehyde groups in those circumstances in which it is appropriate and desirable for such radicals, atoms or groups to be present in the molecular structure in addition to the essential radicals, atoms or groups specified in the general formulae given above.

In some cases it may be advantageous to use in polymers stabilized with a combination of stabilizers containing the above described synergistic combination at least a third component which is a metal salt of an organic acid in which the metal is selected from Groups 1 to 4 and preferably from Group 2 of the Periodic Table and the acid is preferably a long chain fatty acid. The metal salts of organic acids assist in reducing the corrosivity of the polyolefin compositions to molds and other surfaces with which the hot polymer comes in contact. As metal salts of organic acids which may be used as further additives, it is preferred to use salts of long chain fatty acids and metals of Groups 1 to 4 of the Periodic Table. Particularly suitable are, for example, the stearates, oleates and ricinoleates of lithium, calcium, strontium, barium, magnesium, zinc, cadmium, aluminum, tin, lead, and bismuth. Of these the calcium, lithium, barium, cadmium, and lead salts are preferred the calcium salts being particularly preferred. One of the special advantages of the calcium salts is that they are non-toxic. Calcium stearate in particular is applicable for general use in Ziegler polyethylene and polypropylene together with the stabilizer combination of the present invention. Suitable salts are those of fatty acids having at least 6, preferably at least 8 or 10 and generally up to 30 carbon atoms per molecule. The presence of other additives in the polymer compositions of the present invention is also possible and in some cases may be desirable. For example, the presence of one of the well-known phenolic antioxidants is advantageous in some instances. Conventional additives such as fillers, pigments, and plasticizers may be present.

The inhibitor combinations of this invention can be used to stabilize a variety of polymer compositions against deterioration resulting from exposure to actinic light. In general, the stabilizable compositions comprise a major proportion of a polyolefin prepared by the so-called low pressure polymerization process, i.e., a process operating at pressures below about 500 atmospheres, using a stereospecific catalyst system. A variety of stereospecific catalysts have been described in the literature. They are generally species or modifications of the so-called Ziegler or Natta catalysts. The resulting polymers are essentially linear in structure. Ziegler polymerization processes are described in U.K. patent specification Nos. 799,392; 799,823; 801,031; and 810,023.

In the production of linear polymers, the reaction mixture formed in the low pressure polymerization is treated to deactivate the catalyst, usually by contact with a polar compound such as an alcohol and/or hydrochloric acid, and is subsequently worked for removal of at least a substantial part of the catalyst residue. The resulting polymer almost invariably contains at least traces of catalyst residue. Typically, it may contain 50 to 500 parts per million (p.p.m.) of each of the catalyst components, calculated as the corresponding metal. A carefully purified polymer may contain as little as 10 p.p.m. of each metal or less. The additives of this invention are effective in polymer containing catalyst residues.

The Ziegler type catalysts may be designated "metal alkyl-reducible metal halide type" and the Natta type catalysts "performed metal subhalide type." This terminology is used, for example, in "Polyolefin Resin Processes" by Marshall Sittig, Gulf Publishing Co., Houston, Texas, 1961. These well-known catalysts are the reaction products of halides, in order of preference, chlorides and bromides, of transition metals from subgroups A of Groups 4 and 5 of the Mendeleev Periodic Table, as illustrated on page 28 of Ephraim, "Inorganic Chemistry" Sixth English edition, i.e., Ti, Zr, Hf, V, Nb, or Ta, with organometallic reducing agents in which the metal is from Groups 1, 2, or 3. Preferred reducing agents are organo-aluminum compounds and particularly aluminum alkyls, including aluminum alkyl halides. Among the effective catalysts are those prepared, for example, (a) by mixing an aluminum trialkyl, e.g., aluminum triethyl or triisobutyl or an aluminum alkyl halide, e.g., aluminum diethyl monochloride, with a Group 4A metal halide, in particular a chloride, e.g., titanium tetrachloride or trichloride; or (b) by mixing an aluminum trialkyl, e.g., aluminum triethyl, with titanium tetrachloride in substantially stoichiometric amounts (which term includes a slight excess, e.g., up to 20% wt. of the aluminum trialkyl) and, after reduction of $TiCl_3$ has taken place, adding an aluminum dialkyl chloride, e.g., aluminum diethyl chloride thereto.

While the present invention is particularly suitable for the inhibition of linear polyethylene it can also be used in the inhibition of other polymers of alpha-olefins, particularly those having from 3 to 10 carbon atoms, including both straight chain and branched terminally unsaturated alkenes, e.g., propylene, butene-1, 4-methylpentene-1, 3-methylbutene-1, 3,3-dimethylbutene-1, pentene-1 and the like, particularly those of 1 to 6 carbon atoms per molecule, and also including copolymers of two or more such olefins, e.g., copolymers of ethylene with propylene or with butene-1. Other hydrocarbon polymers may also be stabilized according to this invention, e.g., high pressure polyethylene and polystyrene.

The additives of this invention are generally each employed in amounts from 0.001 up to about 5% by weight, based on the amount of polymer. In the case of the preferred organic thiophosphites, the amount of thiophosphite is preferably between about 0.05% and 2%, most preferably from about 0.1% to 1%; the amount of the second aromatic component is preferably between about 0.1% and 5%, most preferably from about 0.3 to 1% by weight of the polymer. About 0.3 to 0.5% of each additive will usually be sufficient. Mixtures of one or more of said organic thiophosphites, together with one or more of said second aromatic components can be present in the polymer compositions of the present invention if desired; it will normally be sufficient to use one such organic thiophosphite in combination with one such aromatic stabilizing compound.

The weight ratios of the thiophosphite and second aromatic component are suitably approximately 1:1, but they may vary, for example, in the range from 1:20 to 20:1. Preferred ratios are from 1:10 to 10:1, and more preferably from 1:5 to 2:1.

Any suitable method may be employed for incorporating the additive combination of this invention into olefin polymers. Several such methods are well known. In a particularly suitable method, a polymer composition comprising a major proportion of a polyolefins, such as Ziegler polyethylene, and a minor proportion of additives of this invention is prepared by dry blending said additives with said polymer, for example in a powder blender, and thereafter mechanically working the resulting dry blend at an elevated temperature, as for example by milling at a temperature above about 100° or by extrusion or by mixing in a Banbury mixer, e.g., at 150–170° C. Mixing can be carried out in an extruder, for example, so that the resulting composition is formed as pellets or nibs for supplying to the plastic molding industry. If desired a masterbatch method can be used to form the required polymer compositions.

The polymer compositions of the present invention can be used generally for the fabrication of plastic material or articles, e.g., by injection molding or melt extrusion. Polyolefin compositions in accordance with the present invention are particularly suitable for making film and filaments.

The effect of ultraviolet light on a hydrocarbon polymer, e.g., a Ziegler polyolefin, is to cause degradation which makes the polymer brittle. Brittleness can be measured by a flexing test and the light stabilizing effectiveness of a particular additive can be expressed in terms of the brittleness of the polymer containing the additive as determined by the flexing test. For example, a sample of standard dimensions of the polymer containing the additive (conveniently a strip 0.5 cm. wide, 10 cm. long and 0.060 cm. thick) can be exposed to ultraviolet radiation for a sufficiently long period that breakage occurs on the first flexing. In carrying out this determination, a standard sample of the polymer with the additive is flexed before exposure until breakage occurs and the number of flexes required is noted. Another sample of the polymer with the additive is exposed for a number of hours and then flexed to breakage and the number of flexes required is again noted. This procedure can be repeated for other samples with increasing exposure periods and from the results the number of flexes can be plotted against the number of hours to give a graph from which the exposure period in hours required to degrade the polymer to such an extent that breakage occurs on flexing once can be determined. In some cases it is more convenient to express the light stability of a polymer in terms of time (T hours) and a percentage determined by dividing the number of flexes required for breakage after T hours exposure by the number of flexes required for breaking the unexposed polymer; this method was used to obtain the percentage figures (referred to as "percent flex") in the following specific example. It will be realized that the period for 0% flex is in fact the exposure period resulting in breakage on flexing once only. Any suitable light radiation can be employed, for example, natural sunlight or an artificial source of ultraviolet light radiation, providing that when comparisons are made care is taken to employ the same test method in each case for the sake of consistency. The figures quoted in the following examples were obtained by exposure to sunlight of Curacao.

The present invention is illustrated by the following example. The abbreviattion "phr" has its ordinary significance in the art, namely "parts per hundred resin," i.e., parts of additive per hundred parts of polymer. All parts and percentages are by weight unless otherwise stated. The results shown are illustrative of preferred embodiments and are not to be considered a limitation of this invention.

*Example 1*

A Ziegler polyethylene is milled at 160° C. with various amounts of additive(s) as indicated in the table below to form a homogeneous blend in each case. The resulting compositions are pressed into sheets and tested for flex life in the manner described above. The results obtained are indicated in the table below in which the abbreviation TLTP signifies trilauryl trithiophosphite; OPS signifies octyl phenyl salicylate, and HOBP signifies 2-hydroxy-4-n-octyloxy benzophenone:

| Additives: | Percent flex after 1200 hours exposure |
|---|---|
| None (failed at 400 hours) | 0 |
| 0.4 phr TLTP | 28 |
| 0.4 phr OPS | 17 |
| 0.2 phr TLTP, 0.2 phr OPS | 77 |
| 0.4 phr TLTP, 0.4 phr OPS | 85 |
| 0.4 phr HOBP | 42 |
| 0.2 phr TLTP, 0.2 phr HOBP | 80 |
| 0.4 phr TLTP, 0.4 phr HOBP | 100 |

*Example 2*

Example 1 is repeated, with substitution, for TLTP, of trioctyl trithiophosphite and tristearyl trithiophosphite. Similarly good protection of polyethylene is obtained. The odor, on milling, is good.

*Example 3*

Example 1 is repeated with substitution, for OPS, of 4-tert. phenyl butyl salicylate and dodecylphenyl salicylate, in separate experiments. Similarly good protection of polyethylene is obtained. The odor, on milling, is good.

*Example 4*

Example 1 is repeated with substitution, for HOBP, of 2,2'-dihydroxy-4-methoxybenzophenone and 2,2'-dihydroxy-4-n-octyloxy benzophenone, in separate experiments. Similarly good protection of polyethylene is obtained. The odor, on milling, is good.

*Example 5*

An extended flex life is also obtained when low pressure polymers of propylene, 1-butene and 4-methyl-1-pentene, respectively, are stabilized with the combined inhibitors of this invention as illustrated in Examples 1–4.

The preferred modes of practicing this invention having been described, other modifications within the scope of the invention will be apparent to persons skilled in the art.

We claim as our invention:
1. A polymer composition comprising
   (a) a solid alpha monoolefin olefin polymer, and
   (b) from 0.05 to 2 percent by weight, based on polyolefin of a trialkyl trithiophosphite in which the alkyl groups have from 6 to 20 carbon atoms, each, and
   (c) from 0.1 to 5 percent by weight, based on polyolefin, of a compound having the formula

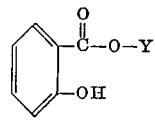

wherein Y represents an alkyl substituted phenyl radical in which the alkyl substituent contains from 1 to 20 carbon atoms,
said components (b) and (c) being present in a weight ratio in the range from 1:5 to 2:1.

2. A polymer composition comprising
   (a) a solid olefin polymer,
   (b) from 0.05 to 2 percent by weight, based on polyolefin, of a trialkyl trithiophosphite in which the alkyl groups have from 6 to 20 carbon atoms, each, and
   (c) from 0.1 to 5 percent by weight, based on polyolefin, of a benzophenone derivative of the general formula

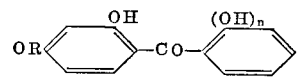

wherein OR represents an alkoxy radical having 1 to 15 carbon atoms and $n$ is selected from 0 and 1,
said components (b) and (c) being present in a weight ratio in the range from 1:5 to 2:1.

3. A polymer composition comprising
   (a) linear polyethylene,
   (b) from 0.5 to 2 percent by weight, based on polyethylene, of trilauryl trithiophosphite, and
   (c) from 0.1 to 5 percent by weight, based on polyethylene, of octyl phenyl salicylate,
said components (b) and (c) being present in a weight ration in the range from 1:5 to 2:1.

4. A polymer composition according to claim 3 in which dodecyl phenyl salicylate is substituted for octyl phenyl salicylate.

5. A polymer composition according to claim 3 in which 4-tert-butyl phenyl salicylate is substituted for octyl phenyl salicylate.

6. A polymer composition comprising
 (a) linear polyethylene,
 (b) from 0.5 to 2 percent by weight, based on polyethylene of trilauryl trithiophosphite, and
 (c) from 0.1 to 5 percent by weight, based on polyethylene, of 2-hydroxy-4-n-octoxy benzophenone,
said components (b) and (c) being present in a ratio in the range from 1:5 to 2:1.

7. A polymer composition according to claim 6 in which 2,2'-dihydroxy-4-methoxybenzophenone is substituted for said 2-hydroxy-4-n-octoxy benzophenone.

8. A polymer composition according to claim 6 in which 2,2'-dihydroxy-4-n-octoxy benzophenone is substituted for said 2-hydroxy-4-n-octoxy benzophenone.

References Cited by the Examiner

UNITED STATES PATENTS

| | | | |
|---|---|---|---|
| 2,967,259 | 3/1961 | Hardy et al. | 260—45.85 |
| 3,033,814 | 5/1962 | Tholstrup | 260—45.85 |
| 3,179,621 | 4/1965 | Wright et al. | 260—45.85 |

OTHER REFERENCES

Chaudet, J. H. et al. "Mechanisms of Ultraviolet Stabilization of Plastics," S.P.E. Transactions, vol. 1, No. 1, January 1961, pp. 26–30, p. 29 relied upon. (Copy in Sci. Lib.)

Martinovich, R. J.: "Better Polyolefin UV Resistance" Plastic Technology, vo. 9, November 1936, pp. 45 to 48, pp. 45 and 48 relied upon. (Copy in Sci. Lib.)

LEON J. BERCOVITZ, *Primary Examiner.*

G. W. RAUCHFUSS, *Assistant Examiner.*